United States Patent [19]
Douglas-Hamilton

[11] 3,787,759
[45] Jan. 22, 1974

[54] METHOD OF AND APPARATUS FOR MEASURING THE PURITY OF THE GASEOUS MEDIUM IN GAS LASERS

[75] Inventor: Diarmaid H. Douglas-Hamilton, Boston, Mass.

[73] Assignee: AVCO Corporation, Cincinnati, Ohio

[22] Filed: Nov. 20, 1972

[21] Appl. No.: 308,272

[52] U.S. Cl................................. 324/25, 250/217
[51] Int. Cl........................................... G01r 31/22
[58] Field of Search ................. 324/24, 25; 250/217

[56] References Cited
UNITED STATES PATENTS
2,761,104  8/1956  Morris .................................. 324/25
3,249,859  5/1966  Speros et al. ......................... 324/24

Primary Examiner—James W. Lawrence
Assistant Examiner—T. N. Grigsby
Attorney, Agent, or Firm—Charles M. Hogan, Esq.; M. E. Frederick, Esq.

[57] ABSTRACT

A method of and apparatus for determining the gas purity in gas lasers comprising means for producing free electrons or ionization as by a broad electron beam or the like in combination with further means for producing an electrical sustainer field, wherein in the presence of the sustainer field the production of free electrons or ionization is sharply terminated and the previously flowing sustainer field current is measured, the decay characteristics of the sustainer field current after termination of the production of free electrons being indicative of the presence or absence of substances adversely affecting the electron number density.

10 Claims, 3 Drawing Figures

PATENTED JAN 22 1974  3,787,759

METHOD OF AND APPARATUS FOR MEASURING THE PURITY OF THE GASEOUS MEDIUM IN GAS LASERS

The present invention relates to lasers and particularly to means for and a method of detecting the presence of undesirable substances in the gaseous medium of flowing gas lasers.

In recent years, substantial progress has been made in the development of high mass flow gas lasers in which the laser gases flow through the working region or optical cavity in either the open or closed-cycle mode.

The electrically excited convection cooled $CO_2$ lasers appears to offer the greatest potential for applications requiring high average power. The very high power capability of $CO_2$ lasers (lasers however pumped using a gaseous lasing mixture of carbon dioxide and nitrogen typically combined with helium) was first demonstrated with the gas dynamic type of laser. For a comprehensive discussion of the gas dynamic type laser, reference is made to U.S. Pat. application, Ser. No. 80,152 filed Oct. 12, 1970, now U. S. Pat. No. 3,713,030, assigned to the same assignee as this application. See, also, "Performance of an Unstable Oscillator on a 30-kW cw Gas Dynamic Laser" by E. V. Locke, R. Hella and L Westra, Avco Everett Research Laboratory, *IEEE Journal of Quantum Electronics*, Vol. QE-7, pp. 581–585, Dec. 1971. However, electrically excited lasers and especially electrically excited convection cooled $CO_2$ lasers appear to be better suited than gas dynamic lasers for commercial applications such as, for example, heat treating, welding and cutting which require high power, long operating time and precise control.

Of the many types of lasers presently under development such as, for example, the HF/DF lasers and CO lasers, $CO_2$ lasers have the benefit of earlier and far greater development efforts. Further, over the past several years, research and development efforts have been concentrated on electrically excited convection cooled $CO_2$ lasers operating in the closed-gas cycle mode. Such convection lasers that utilize a single large discharge volume appear best suited for use in high power laser systems, because such lasers offer among other things a clean aerodynamic design, minimum ducting, low pressure loss in the laser channel and a uniform active medium. For a discussion of one type of such laser, reference is made to "Electrical Discharge Convection Lasers" by J. W. Davis and C. O. Brown, AIAA Paper No. 72-722, AIAA Fifth Fluid and Plasma Dynamics Conference, June 26, 1972. For a description of another type of such a laser suitable for commercial applications, reference is made to U.S. Pat. application, Ser. No. 50,933 filed June 29, 1970 entitled "Electrically Excited Flowing Gas Laser and Method of Operation" in the name of James P. Reilly, now U.S. Pat. No. 3,721,915 and U.S. Pat. application, Ser. No. 72,982 filed Sept. 17, 1970 entitled "Laser or Ozone Generator in Which a Broad Electron Beam with a Sustainer Field Produces a Large Area, Uniform Discharge" in the names of Jack D. Daugherty, Diarmaid H. Douglas-Hamilton, Richard M. Patrick and Evan R. Pugh, now U.S. Pat. No. 3,702,973 and of common assignment with the present invention.

Because of the high-mass-flow rates of the laser gases and the large pumping capacities required for high power operation, system considerations indicate that operation is preferably in a closed-gas cycle, i.e., a mode in which the laser gases are continuously recirculated and used. However, the performance of $CO_2$ electric-discharge convection lasers operating in the closed-gas-cycle mode are degraded relative to open-cycle performance levels due to reduced discharge operation and/or stability limits. This reduction in discharge power results in a concomitant reduction in the optical output capability of the laser device when operating in the preferred closed-cycle mode.

The presence of substances with high electron affinity in the discharge such as, for example, oxygen, water, iron carbonyl and many other species depending on the constituents of the gaseous medium results in a more or less large increase in the electron loss processes and the consequent reduction of the steady-state electron density. The presence of such substances may result from the initial presence of contaminant species or the subsequent introduction of contaminant species into the gaseous medium as when make-up gases are supplied or leaks occur. The presence of such substances may also result from decomposition of the gaseous medium. Accordingly, it is an object of the present invention to provide a method of and apparatus for detecting the presence of undesirable substances in the gaseous medium of gas lasers.

It is another object of the present invention to detect the presence of substances with high electron affinity in the discharge of a flowing gas laser.

It is a further object of the present invention to detect the presence of substances exhibiting electron attachment in electrically excited flowing gas lasers wherein excitation is achieved by utilizing means for producing free electrons in combination with means for producing an electrical sustainer field.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Determination of gas purity in electrically excited flowing gas lasers wherein electrical excitation is achieved by ionizing the gas in the presence of an electrical sustainer field, such as, for example, in an electron beam $CO_2$ laser is important to maintain or provide maximum performance. The presence of substances with high electron affinity in the discharge such as, for example, oxygen, water, iron carbonyl and many other species, results in a more or less large increase in the electron loss processes, and the consequent reduction of the steady-state electron density. Detection of the presence of such substances is therefore of great importance.

In accordance with the invention, the presence of undesirable substances exhibiting electron attachment may be detected quite simply by sharply removing the ionizing source while maintaining the sustainer field across the discharge, and measuring the effect on the sustainer current. In the case that no attachment is present, the sustainer current history has a relatively "slow" decay and follows the relationship $$I_s = I_{so}/1 + \alpha\, n_{eo}\, t$$

(1)

where $I_{so}$ is the initial value of the sustainer current, $\alpha$ the electron-ion recombination rate, $n_{eo}$ the initial value of the electron density, and $t$ the time interval measured from the instant at which the ionizing source such as, for example, an electron beam is switched off. The aforementioned "slow" decay may be seen by integrating the equation describing the electron number density, $$dne/dt = S - \alpha n_e^2$$

(2)

where $ne$ is the electron density and $S$ is the secondary electron production rate, taken as zero. Since the sustainer field is still on, it will be seen that the sustainer current must be proportioned to the electron number density which decreases relatively slowly in the absence of attachment.

However, when attachment or an attaching impurity is present, equation (2) becomes:

$$dne/dt = S - \alpha\, ne^2 - \beta ne$$

(3)

where $\beta$ is the attachment rate. Integration of equation (3) in this case yields an exponential decay for $I_s$ after an initial brief time during which the recombination term may dominate. The presence of attachment is indicated by the exponential decay of the sustainer current, given by the relation $$I_s = I_{so} e^{-\beta t}$$

(4)

instead of a slower decay given by equation (1).

Figure 1:
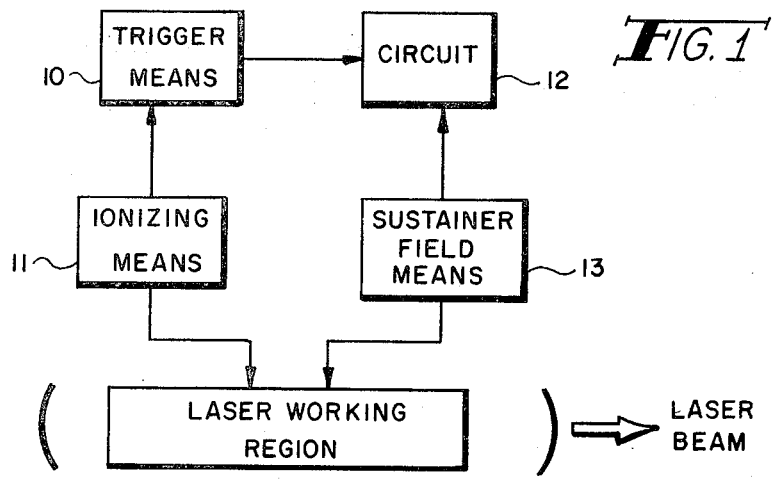
FIG. 1 is a block diagram of means in an ionizer-sustainer field laser for carrying out the invention.

Thus, as illustrated in FIG. 1, trigger or actuating means 10 may be provided effective to shut off the ionizing means 11 and simultaneously actuate a conventional cathode ray oscilloscope 12. The cathode ray oscilloscope displays in conventional manner sustainer current history obtained from the sustainer field means 13 with respect to time beginning substantially with the removal of the ionizing means.

As previously noted, a sharp removal of the ionizing source is necessary to provide satisfactory sensitivity. In the case where an ionizing electron beam is used, appropriate rapid quenching of the ionizing electron beam may be readily achieved by pulsing the filament of the electron beam generator positive with respect to the emitter grid in time of the order of 1—2 $\mu$ seconds. For a more detailed discussion of suitable electron beam generator means, reference is made to aforementioned U.S. Pat. application, Ser. No. 72,982.

Figure 2:
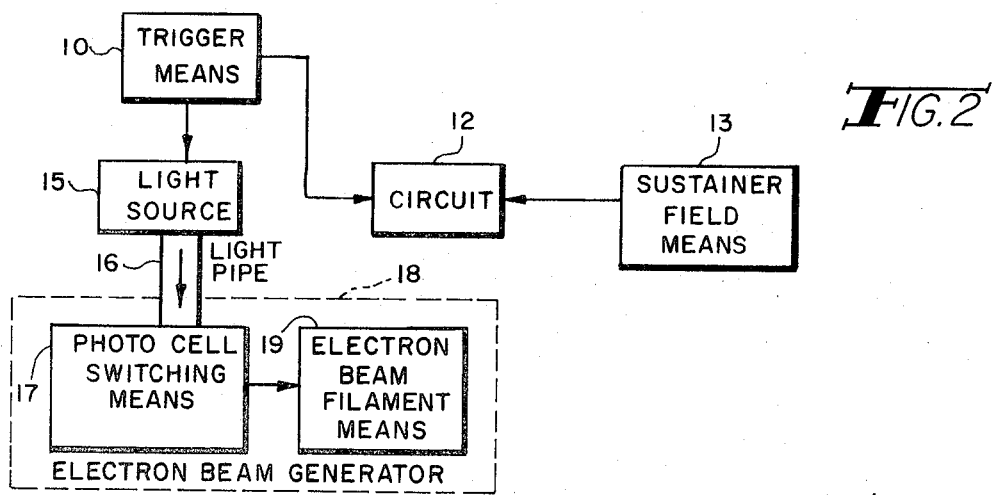
FIG. 2 is a block diagram illustrating apparatus for carrying out the invention in an electron beam-sustainer field laser.
Figure 3:
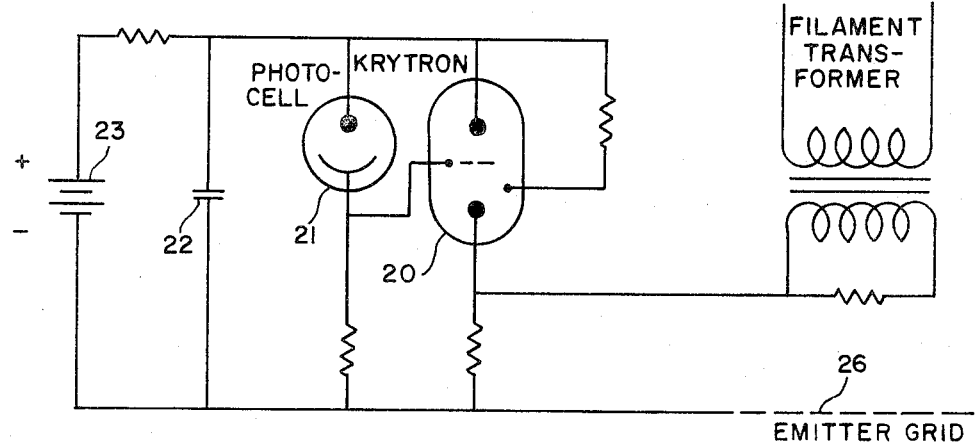
FIG. 3 is a schematic diagram of the photo cell switching means shown in FIG. 2.

Referring now to FIG. 2, the trigger means 10 actuates a light source 15 such as a xenon flashtube and the cathode ray oscilloscope 12. The light from the flashtube is conveyed via a light pipe 16 to photo cell switching means 17 in the electron beam generator 18. Suitable photo cell switching means, as illustrated in FIG. 3 may comprise a Kryton switch 20 actuated by a photo cell 21 (actuated by light from the light pipe 16) and capacitor 22 connected in parallel across a power source 23.

Actuation of the Kryton switch 20 drives the filament 25 positive with respect to the emitter grid 26, thereby removing the electron beam.

The sustainer voltage should be held constant during the measurement. Accordingly, if the sustainer circuit inductance is not sufficiently low as to prevent the introduction of error, then such should be taken into account in interpreting the results of the measurement.

After the electron beam has been removed, the sustainer current will undergo exponential decay in the presence of species exhibiting electron neutral attachment as expressed in equation (4). The quantity $\beta$ may be determined from the decay of $I_s$, and if the species causing the attachment is known, and if its attachment coefficient is also known, the number density of said species is obtained from $\beta$.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In the method of determining the gas purity of gas lasers, the steps comprising:
   a. ionizing a portion of the gas in the laser;
   b. applying a sustainer voltage across the said ionized portion of said gas to produce a flow of sustainer current through said ionized portion of said gas;
   c. sharply terminating the ionization of said gas; and
   d. measuring the said sustainer current flow after termination of said ionization.

2. The method as claimed in claim 1 wherein said ionization is terminated in about one microsecond.

3. The method as claimed in claim 1 wherein a substantially exponential decay of said sustainer current is indicative of an undesirable decrease in electron density of said ionized gas.

4. The method as claimed in claim 3 wherein said gas comprises carbon dioxide and nitrogen.

5. The method as claimed in claim 1 wherein in the presence of undesirable substances with high electron affinity, said sustainer current decreases substantially in accordance with the relationship $$I_s = I_{so} e^{-\beta t}$$

where $I_s$ is the sustainer current, $I_{so}$ is the initial value of the sustainer current, $\beta$ is the electron attachment rate, and $t$ is time.

6. The method as claimed in claim 5 wherein the absence of undesirable substances with high electron affinity, said sustainer current decreases substantially in accordance with the relationship $$I_s = I_{so}/1 + \alpha\, n_{eo} t$$

where $I_s$ is the sustainer current, $I_{so}$ is the initial value of the sustainer current, $\alpha$ is the electron-ion recombination rate, $n_{eo}$ is the initial value of the electron density, and $t$ is the time interval.

7. Apparatus for determining the gas purity of gas lasers comprising:
   a. ionizing means for ionizing a portion of the gas in the laser;

b. sustainer circuit means for applying a sustainer voltage across the said ionized portion of said gas to produce a flow of sustainer current through said ionized portion of said gas;

c. means for sharply deactuating said ionizing means to sharply terminate ionization of said gas; and d. means for measuring said sustainer current flow after termination of said ionization.

8. Apparatus as claimed in claim 7 and additionally including means for causing said gas to flow through a working region, said gas comprises carbon dioxide and nitrogen, and said ionizing means comprises means for generating a broad area electron beam and introducing said broad area electron beam into said working region.

9. Apparatus as claimed in claim 8 wherein said means for deactivating said ionizing means comprises a light source, switching means including photo cell means disposed in said ionizing means, and a light pipe for conducting light from said light source to said photo cell means.

10. Apparatus as claimed in claim 9 and additionally including cathode ray oscilloscope means; trigger means for simultaneously actuating said light source and said cathode ray oscilloscope means; and means coupling said sustainer circuit means to said oscilloscope means whereby upon actuation of said trigger means current flowing in said ionized gas is displayed.

* * * * *